(12) United States Patent
Born et al.

(10) Patent No.: US 11,959,208 B2
(45) Date of Patent: Apr. 16, 2024

(54) KNITTING OF PRECIOUS METAL NETWORKS AND A METHOD USING SAME

(71) Applicant: UMICORE AG & CO. KG, Hanau-Wolfgang (DE)

(72) Inventors: Dirk Born, Langenselbold (DE); Dietmar Koenigs, Gelnhausen (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 156 days.

(21) Appl. No.: 17/760,507

(22) PCT Filed: Sep. 16, 2020

(86) PCT No.: PCT/EP2020/075802
§ 371 (c)(1),
(2) Date: Mar. 15, 2022

(87) PCT Pub. No.: WO2021/052980
PCT Pub. Date: Mar. 25, 2021

(65) Prior Publication Data
US 2022/0349096 A1 Nov. 3, 2022

(30) Foreign Application Priority Data
Sep. 17, 2019 (EP) ..................................... 19197709

(51) Int. Cl.
*D04B 7/30* (2006.01)
*B01J 23/44* (2006.01)
(Continued)

(52) U.S. Cl.
CPC ................ *D04B 7/30* (2013.01); *B01J 23/44* (2013.01); *B01J 35/06* (2013.01); *C01B 21/38* (2013.01); *D10B 2101/20* (2013.01)

(58) Field of Classification Search
CPC ... D04B 1/12; D04B 1/14; D04B 1/16; D04B 21/08; D04B 21/16; D04B 7/04; D04B 7/30; B01J 23/42; B01J 23/44; B01J 35/06
See application file for complete search history.

(56) References Cited

U.S. PATENT DOCUMENTS 2,274,684 A * 3/1942 Goodloe ................ D04B 21/14
55/525
3,874,645 A * 4/1975 Aguinet ................... B01J 23/86
422/222
(Continued)

FOREIGN PATENT DOCUMENTS

DE 27 49 061 A1 5/1978
DE 42 06 199 C1 11/1992
(Continued)

OTHER PUBLICATIONS

International Search Report for PCT/EP2020/075802, dated Jan. 15, 2021 (6 pgs. with English Translation).
(Continued)

*Primary Examiner* — Danny Worrell
(74) *Attorney, Agent, or Firm* — Smith, Gambrell & Russell, LLP

(57) ABSTRACT

The invention relates to a method for producing large stainless steel meshes on flatbed knitting machines, comprising the steps of providing stainless steel wire and knitting a stainless steel mesh, characterized in that one stainless steel mesh each is knitted on the front and the rear needle bed of the flatbed knitting machine at the same time, and these two stainless steel meshes are linked to each other on one side by connecting stitches.

21 Claims, 3 Drawing Sheets

(51) Int. Cl.
  *B01J 35/06* (2006.01)
  *C01B 21/38* (2006.01)

(56) References Cited

U.S. PATENT DOCUMENTS

| | | | |
|---|---|---|---|
| 4,341,830 A | 7/1982 | Betts | |
| 4,351,887 A * | 9/1982 | Bishop | B01J 19/002 |
| | | | 423/403 |
| 4,609,923 A * | 9/1986 | Boan | H01Q 15/161 |
| | | | 343/912 |
| 4,869,891 A * | 9/1989 | Handley | B01J 23/40 |
| | | | 423/403 |
| 5,188,813 A * | 2/1993 | Fairey | C01B 21/265 |
| | | | 423/403 |
| 5,232,891 A | 8/1993 | Hörmann | |
| 5,266,293 A | 11/1993 | Fairey | |
| 5,268,157 A | 12/1993 | Blass | |
| 6,073,467 A * | 6/2000 | Blass | B01J 35/06 |
| | | | 66/196 |
| 6,089,051 A * | 7/2000 | Gorywoda | D04B 21/12 |
| | | | 66/170 |
| 6,374,643 B2 * | 4/2002 | Orima | D04B 21/202 |
| | | | 66/193 |
| 11,242,628 B2 * | 2/2022 | Mueller | D04B 1/22 |

FOREIGN PATENT DOCUMENTS

| | | |
|---|---|---|
| DE | 40 28 916 G2 | 5/1994 |
| EP | 0 364 153 B1 | 3/1992 |
| EP | 2 960 362 A1 | 12/2015 |

OTHER PUBLICATIONS

Written Opinion of the International Searching Authority PCT/EP2020/075802, dated Jan. 15, 2021 (7 pgs.).
A. Jess, Chemical Technology An Integrated Textbook, Chapter 6.4, 2013, www.wiley-vch.de, (pp. 568-583).
Extended European Search Report dated May 18, 2020 for European Patent Application No. 19197709.9 (8 pages in German with English machine translation).
Translation of the Written Opinion of the International Searching Authority dated Jan. 15, 2021 for International Patent Application No. PCT/EP2020/075802 (6 pages).
International Preliminary Report on Patentability dated Mar. 15, 2022 for International Patent Application No. PCT/EP2020/075802 (7 pages in German with English Translation).
diedrahtweber.com. Fertigungsprozesse. [Manufacturing Processes] https://www.diedrahtweber.com/de/gewebe-und-ausruestung/fertigungsprozesse/ Accessed Sep. 1, 2020 (2 pages in German with English Translation).
Brochure. Drahtgewebe [Woven Wire Cloth] DDD Dorstener Drahtwerke (www.diedrahtweber.com/de/gewebe-und-ausruestung/fertigungsprozesse/, downloaded on Sep. 1, 2020 (12 pages in German/English language).

* cited by examiner

_US 11,959,208 B2_

KNITTING OF PRECIOUS METAL NETWORKS AND A METHOD USING SAME

FIELD OF THE INVENTION

This invention relates to a process for producing precious-metal gauzes, as is used for the catalytic oxidation of ammonia.

Precious-metal-catalyzed gas reactions, such as the oxidation of ammonia with atmospheric oxygen in nitric acid production (Ostwald process) or the reaction of ammonia with methane in the presence of oxygen to give hydrocyanic acid (Andrussow process) have long been considered extremely important from an industrial perspective; after all, they provide base chemicals for the chemical industry and for fertilizer production on a large industrial scale (Andreas Jess, Peter Wasserscheid: Chemical Technology (Wiley-VCH Verlag, Weinheim 2013) Chapter 6.4.)

At the center of these heterogeneously catalyzed gas reactions are precious metal catalysts in the form of gas-permeable spatial structures, on or in which the reaction takes place. Precious-metal gauzes in the form of woven fabrics (DE4028916C2) or knitted fabrics (EP0364153B1, DE4206199C1, U.S. Pat. No. 5,268,157A) made of fine precious-metal wires have long been established.

The precious-metal wires consist predominantly of platinum, rhodium, or of alloys of said metals with other precious metals or non-precious metals. Platinum-rhodium alloys having 4 to 12 wt. % rhodium and platinum-palladium-rhodium alloys having 4 to 12 wt. % palladium and rhodium are typical.

The precious-metal gauzes are usually arranged in a flow reactor in a plane perpendicular to the flow direction of the gas mixture in order to be used as catalyst gauzes. Conical arrangements are also known. A plurality of catalyst gauzes are usually expediently arranged one after the other and combined to give a catalyst gauze stack.

Platinum recovery gauzes, so-called getter gauzes, which serve to recover platinum and rhodium discharged from the catalyst gauzes convectively with the reaction gas stream in the form of gaseous oxides, are usually arranged downstream of the catalyst gauze stack. Said getter gauzes usually contain wires made of palladium or palladium alloys, such as palladium-nickel alloys having 2 to 15 wt. % nickel, palladium-copper alloys having 2 to 15 wt. % copper and palladium-nickel-copper alloys having 2 to 15 wt. % nickel and copper. Separating gauzes made of high-temperature steel, which are intended to prevent sintering of the gauzes, are usually located not only between the catalyst gauze stack and the first getter gauze but also between the getter gauzes.

DETAILED DESCRIPTION

The invention is applicable to catalyst and getter gauzes. Reference is made below, therefore, to precious-metal gauzes, wherein this term is intended to cover catalyst and getter gauzes.

Figure 1:
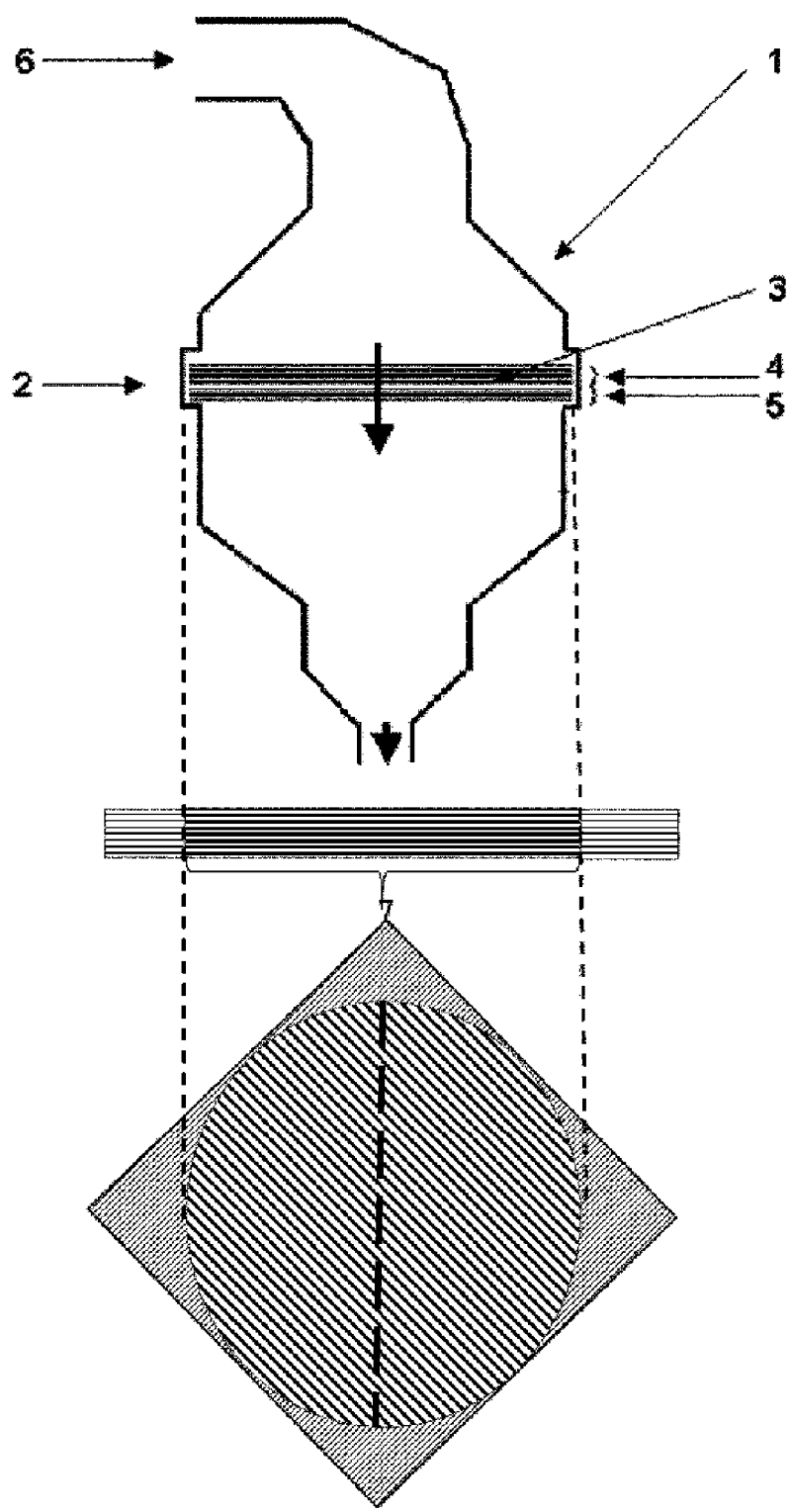
FIG. 1 schematically shows the reactor with the gauze stack integrated therein.

Taking the example of catalytic ammonia oxidation, FIG. 1 schematically shows the reactor with the gauze stack integrated therein, the function of which is described below:

In the reaction plane (2) of the flow reactor (1), the gauze stack (3), which consists of a plurality of catalyst gauzes (4) arranged one after the other and of downstream separating and getter gauzes (5), is arranged in a plane perpendicular to the flow direction. This gauze stack having a minimum gauze diameter (7) is held in its position by clamping.

The mixture of ammonia and atmospheric oxygen (having an ammonia content of 9-13 vol. %) (6) flows through the gauze stack (3) at atmospheric or increased pressure, wherein ignition of the gas mixture takes place in the inlet region and the combustion reaction giving nitrogen monoxide (NO) and water encompasses the entire reaction zone:

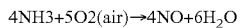

$$4NH_3 + 5O_2(air) \rightarrow 4NO + 6H_2O$$

The NO in the outflowing reaction gas mixture subsequently reacts with excess atmospheric oxygen to give $NO_2$:

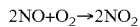

$$2NO + O_2 \rightarrow 2NO_2$$

The $NO_2$ in turn reacts in a downstream absorption with water to give nitric acid, which is routed, for example, to fertilizer production:

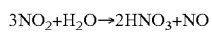

$$3NO_2 + H_2O \rightarrow 2HNO_3 + NO$$

Figure 2:
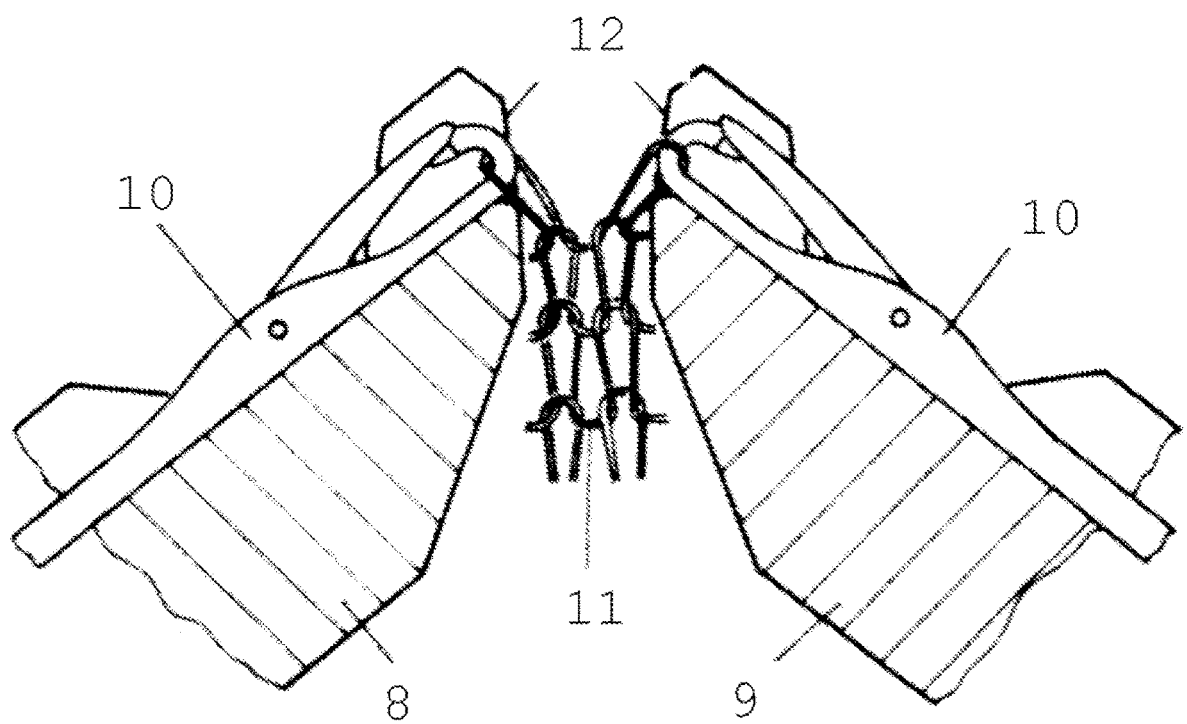
FIG. 2 shows the structure of a flat-bed knitting machine.

The production of precious-metal gauzes on the flat-bed knitting machine is described in U.S. Pat. No. 5,268,157A (the term "Flachbettstrickmaschine" is also customary in German due to translation from the English "flat-bed knitting machine"). The structure of the flat-bed knitting machine is illustrated in FIG. 2. The flat-bed knitting machine has a front (8) and a rear needle bed (9) in which the needles (10) are installed. The needles pass through different positions depending on the programming of the machine. The programming thus specifies the structure of the knitted fabric. A special feature of flat-bed knitting technology with respect to other fabric-forming machines is that the knitted fabrics can be formed synchronously and independently of one another on the front and on the rear needle beds (single-bed product). Moreover, spacer fabrics (two-bed product) can be formed, in which the thread alternating in the front and rear forms meshes or double-knit. The knitted fabric is knitted downwardly between the two needle beds (11). This is done by successively casting off the individual formed meshes over the casting-off position and casting-off web edge (12). Precious-metal gauze production on the flat-bed knitting machine has proven itself in many areas of technology (EP2960362 A1, DE2749061 A1).

Figure 3A:
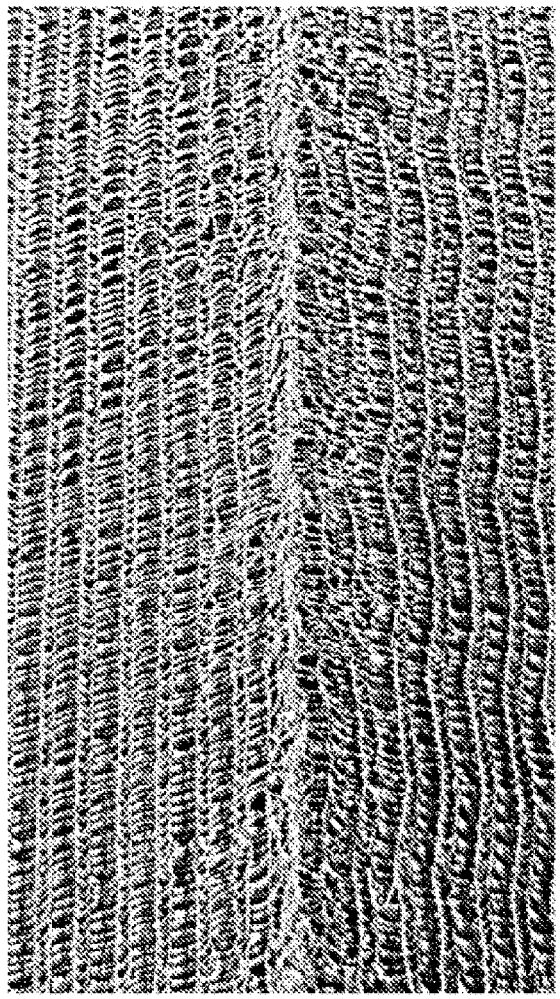
FIG. 3a shows a precious-metal gauze according to the invention with detectable knitting seam.
Figure 3B:
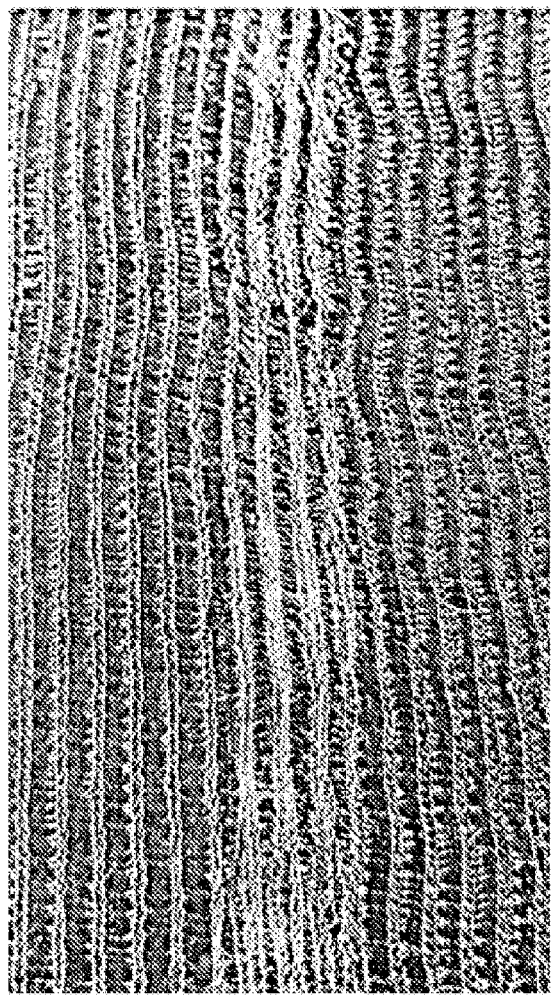
FIG. 3b shows a precious-metal gauze according to the prior art which shows the region of the hammer weld seam.

Knitted precious-metal gauzes have a number of advantages over woven precious-metal gauzes, which is why they are preferred today in industrial use. For one thing, knitting technology offers the potential for a high degree of flexibility with respect to knitting patterns, wire thicknesses used, and resulting basis weight. For another thing, precious-metal knitted fabrics can be produced more economically since set-up times are shorter in knitting technology than in weaving technology. This requires, in particular, a significantly reduced precious-metal bond in production. Flat-bed knitting machines on which precious-metal gauzes of any length can be produced are generally used for this purpose. However, the maximum width is normally predetermined by the width of the knitting bed. For wider precious-metal gauzes, several precious-metal gauzes must be connected via a weld seam, as is currently customary in the case of wire fabrics (www.www.diedrahtweber.com/de/gewebe-und-ausruestung/fertigungsprozesse, downloaded on Sep. 1, 2020; Dorstener Drahtwerke fabric brochure, downloaded on Sep. 1, 2020). Because of their gas impermeability, said weld seams, usually designed as a hammer weld seam, negatively influence turnover and also constitute a mechanical weak point of the precious-metal gauze. In hammer welding, the two precious metal gauzes to be connected are usually superimposed over several rows of mesh and connected by hammering with simultaneous heating. Said weld seams are visible even after the production process has ended. FIG. 3a and FIG. 3b show a precious-metal gauze according to the invention with detectable knitting seam (a) in comparison to a precious-metal gauze according to the prior art (b) which shows the region of the hammer weld seam. As can be seen, the precious-metal gauze is highly compressed in the region of the hammer weld seam and presses the fabric structure together. Furthermore, welding is bound up with greater technical effort and additional production costs.

The object of the present invention was therefore to produce precious-metal gauzes which are free of weld seams and which are wider than the knitting bed of the flat-bed knitting machine and can be knitted in one piece.

This object is achieved by a method for producing precious-metal gauzes on flat-bed knitting machines, which method comprises the steps of
providing precious-metal wire, and
knitting a precious-metal gauze
wherein a precious-metal gauze is knitted simultaneously on the front and rear needle beds of the flat-bed knitting machine, and these two precious-metal gauzes are connected at one side by connecting knit meshes.

In a preferred embodiment variant of the method, the precious-metal gauze which is knitted on the front needle bed is knitted from wire with the same composition as the precious-metal gauze which is knitted on the rear needle bed.

In one embodiment variant, both precious-metal gauzes are knitted in the form of a semicircle, which are then connected at the straight edge so that the product comprises a round precious-metal gauze.

In one embodiment variant, the wire consists of platinum or a platinum alloy. An alloy having at least 75 wt. % platinum is preferably selected as the platinum alloy.

In a further embodiment variant, the wire consists of palladium or a palladium alloy. An alloy having at least 75 wt. % palladium is preferably used as the palladium alloy.

The invention further includes a method for the catalytic oxidation of ammonia, comprising the following steps:
providing precious-metal gauzes produced by the method according to the invention
installing in a flow reactor (1) a gauze stack of the precious-metal gauzes, which were produced based on the method according to the invention
supplying a gas comprising ammonia and oxygen at a temperature in the flow reactor between 500° C. and 1300° C. and a pressure between 0.1 MPa and 1.4 MPa.

The invention is described below with the aid of an example

EXAMPLE

A precious-metal gauze having a width of 2.3 m is knitted in each case on the front and rear knitting beds on a flat-bed knitting machine (Stoll, CMS type), having a knitted bed width of approximately 2.4 m (96 inches) and is connected at one side by a corresponding thread guide. This produces a precious-metal gauze, which is 4.6 m wide and any length.

By using the method according to the invention, precious-metal gauzes, which are free of weld seams, can thus be knitted up to a width that corresponds to twice the width of the knitting bed.

Comparative Example

On a flat-bed knitting machine having a knitted bed width of approximately 2.4 m (96 inches) a precious-metal gauze having a width of 2.3 m is in each case knitted on the front and rear knitted beds.

The two precious-metal gauzes are then connected to one another at one side by welding in order to be able to produce a precious-metal gauze having a precious-metal gauze diameter of 4.6 m.

The example according to the invention and the comparative example result in a precious-metal gauze of the same diameter, but the comparative example requires a further production step (welding). In contrast to the example according to the invention, the product in the comparative example also has a weld seam which runs transversely across the reaction zone and, due to its structure, reduces gas permeability and thus negatively influences the catalytic effect. In addition, it constitutes a mechanical weak point which can lead to material defects, in particular when the precious-metal gauze is being changed.

Legend for FIG. 1:
1 Flow reactor
2 Reaction plane
3 Gauze stack
4 Precious-metal gauzes
5 Getter and separating gauzes
6 Reaction gas
7 Minimum gauze diameter Legend for FIG. 2:
8 Front needle bed
9 Rear needle bed
10 Needles
11 Knitted product
12 Casting-off web edge

The invention claimed is:

1. Method for producing connected precious-metal gauzes with each gauze being knitted on a common flat-bed knitting machine, comprising the steps of
providing precious-metal wire;
knitting first and second precious-metal gauzes,
wherein the first and the second precious-metal gauzes are knitted simultaneously on front (8) and rear (9) needle beds of the flat-bed knitting machine, and the first and the second precious-metal gauzes each have a Z-axis thickness and extend along an X-Y axes plane, and wherein the first and the second precious-metal gauzes are connected along adjacent side edges that each extend in a common X-Y axes plane by connecting knit meshes of the first and the second precious-metal gauzes such that the first and the second gauzes fall on the common X-Y axes plane.

2. Method according to claim 1, characterized in that the precious-metal gauze which is knitted on the front needle bed (8) is knitted from wire of the same composition as the precious-metal gauze which is knitted on the rear needle bed (9).

3. Method according to claim 1, characterized in that both precious-metal gauzes are knitted in semicircle form, which are then connected at straight edges, which define the adjacent side edges, so that the product comprises a round precious-metal gauze combination.

4. Method according to claim 1, characterized in that the wire used consists of platinum or a platinum alloy.

5. Method according to claim 4, characterized in that the wire consists of platinum alloy having at least 75 wt. % platinum.

6. Method according to claim 1, characterized in that the wire used consists of palladium or a palladium alloy.

7. Method according to claim 6, characterized in that the wire consists of palladium alloy having at least 75 wt. % palladium.

8. Method for the catalytic oxidation of ammonia, comprising the steps of
   providing the connected precious-metal gauzes produced according to claim 1
   installing in a flow reactor (1) a gauze stack (3) comprising said connected precious-metal gauzes (4)
   supplying a gas (6) comprising ammonia and oxygen at a temperature in the flow reactor (1) between 500° C. and 1300° C. and a pressure between 0.1 MPa and 1.4 MPa.

9. Method according to claim 1, wherein the connected precious-metal gauzes are connected free of a weld seam.

10. Method according to claim 1, wherein the connected precious-metal gauzes have a width along the X-Y axes plane in a direction that is perpendicular to a direction of elongation of the side edges and that is greater than a width of the knitting bed on which the two precious-metal gauzes are formed.

11. Method according to claim 10, wherein the width of the connected precious-metal gauzes corresponds to twice the width of the knitting bed.

12. Method according to claim 1, wherein a maximum thickness of the connected precious-metal gauzes does not exceed a thickness of a maximum thickness one of the two connected precious-metal gauzes.

13. A method for producing a connected precious-metal gauze combination having first and second precious-metal gauzes that are each knitted with precious metal wire on front (8) and rear (9) needle beds of a common flat-bed knitting machine, wherein the first and the second precious-metal gauzes each have a Z-axis thickness and extend along an X-Y axes plane, the method comprising:
   combining the first and the second precious-metal gauzes to produce the connected precious-metal combination by connecting knit meshes of the first and the second precious metal gauzes along adjacent side edges of the first and the second precious-metal gauzes, with the adjacent side edges each extending within a common X-Y axes plane such that the first and the second gauzes fall on the common X-Y axes plane.

14. Method according to claim 13, wherein the precious-metal gauze which is knitted on the front needle bed (8) is knitted from wire of the same composition as the precious-metal gauze which is knitted on the rear needle bed (9).

15. Method according to claim 13, where both precious-metal gauzes are knitted in semicircle form, which are then connected at straight edges, which define the adjacent side edges, so that the connected precious-metal gauze combination comprises a round precious-metal gauze combination.

16. Method according to claim 13, where the wire is formed of a platinum alloy having at least 75 wt. % platinum.

17. Method according to claim 13, wherein the wire is formed of palladium alloy having at least 75 wt. % palladium.

18. Method for the catalytic oxidation of ammonia, comprising the steps of
   providing the connected precious-metal gauze combination produced according to claim 13
   installing in a flow reactor (1) a gauze stack (3) comprising said connected precious-metal gauze combination (4)
   supplying a gas (6) comprising ammonia and oxygen at a temperature in the flow reactor (1) between 500° C. and 1300° C. and a pressure between 0.1 MPa and 1.4 MPa.

19. Method according to claim 13, wherein the connected precious-metal gauze combination is connected free of a weld seam.

20. Method according to claim 13, wherein the connected precious-metal gauze combination has a width along the X-Y axes plane that is perpendicular to an extension direction of the adjacent side edges and is greater than a width of the knitting bed on which the two precious-metal gauzes are formed.

21. Method according to claim 13, wherein a maximum thickness of the connected precious-metal gauzes does not exceed a thickness of a maximum thickness one of the two connected precious-metal gauzes.

* * * * *